(12) United States Patent
Hedrington

(10) Patent No.: US 11,313,086 B2
(45) Date of Patent: Apr. 26, 2022

(54) MATERIAL DENSITY MEASUREMENT FOR PAVER APPLICATION

(71) Applicant: Caterpillar Paving Products Inc., Brooklyn Park, MN (US)

(72) Inventor: Mathew J. Hedrington, Ham Lake, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 69 days.

(21) Appl. No.: 16/715,627

(22) Filed: Dec. 16, 2019

(65) Prior Publication Data

US 2021/0180271 A1  Jun. 17, 2021

(51) Int. Cl.
*E01C 19/42* (2006.01)
*E01C 23/07* (2006.01)
*E01C 19/48* (2006.01)
*G01N 9/24* (2006.01)

(52) U.S. Cl.
CPC .............. *E01C 23/07* (2013.01); *E01C 19/42* (2013.01); *E01C 19/48* (2013.01); *G01N 9/24* (2013.01)

(58) Field of Classification Search
CPC .......... E01C 19/42; E01C 19/48; E01C 23/07; G01N 9/24
USPC ................. 404/72, 75, 84.05–84.5, 118
See application file for complete search history.

(56) References Cited

U.S. PATENT DOCUMENTS

| | | | |
|---|---|---|---|
| 5,900,736 A * | 5/1999 | Sovik | G01N 9/24 |
| | | | 324/663 |
| 5,952,561 A | 9/1999 | Jaselskis et al. | |
| 6,400,161 B1 * | 6/2002 | Geisel | G01N 22/00 |
| | | | 324/644 |
| 6,799,922 B2 | 10/2004 | Smith | |
| 7,226,239 B2 | 6/2007 | Stridiron et al. | |
| 7,588,388 B2 * | 9/2009 | Hall | E01C 19/176 |
| | | | 404/101 |
| 9,028,167 B2 * | 5/2015 | Buschmann | E01C 19/002 |
| | | | 404/101 |
| 9,200,415 B2 | 12/2015 | Graham et al. | |
| 9,290,894 B2 | 3/2016 | Eul | |
| 10,001,783 B2 * | 6/2018 | Zahr | E01C 19/48 |
| 10,145,837 B2 | 12/2018 | Troxler | |
| 10,227,738 B2 | 3/2019 | Horn et al. | |
| 10,895,046 B2 * | 1/2021 | Buschmann | H04W 4/46 |
| 2008/0003057 A1 * | 1/2008 | Hall | E01C 19/22 |
| | | | 404/84.1 |
| 2009/0287423 A1 * | 11/2009 | Targosz | G01N 33/42 |
| | | | 702/23 |
| 2012/0263531 A1 * | 10/2012 | Rutz | E01C 19/23 |
| | | | 404/72 |
| 2014/0023436 A1 * | 1/2014 | Begley | E01C 19/48 |
| | | | 404/84.1 |
| 2015/0063907 A1 * | 3/2015 | Graham | E01C 19/48 |
| | | | 404/84.1 |
| 2016/0222602 A1 * | 8/2016 | Downing | G01C 21/36 |
| 2017/0060126 A1 * | 3/2017 | Marsolek | E01C 19/48 |
| 2019/0106846 A1 * | 4/2019 | Marsolek | E01C 23/07 |
| 2020/0117201 A1 * | 4/2020 | Oetken | G06K 9/0063 |

* cited by examiner

Primary Examiner — Raymond W Addie
(74) Attorney, Agent, or Firm — Schwegman, Lundberg & Woessner; Jeff A. Greene

(57) ABSTRACT

A paving machine can include a frame; a screed coupled to the frame; and a density sensor coupled to the paving machine and configured to measure a density of an asphalt mat as the screed passes over the asphalt mat.

20 Claims, 2 Drawing Sheets

MATERIAL DENSITY MEASUREMENT FOR PAVER APPLICATION

TECHNICAL FIELD

The present disclosure generally relates to paving equipment. More particularly, the present disclosure relates to an asphalt paving machine.

BACKGROUND

Paving machines are used to apply, spread and compact paving material relatively evenly over a desired surface. These machines are regularly used in the construction of roads, parking lots and other areas where a smooth durable surface is required for cars, trucks and other vehicles to travel. An asphalt paving machine generally includes a hopper for receiving asphalt material from a truck and a conveyor system for transferring the asphalt rearwardly from the hopper for discharge onto a roadbed. Screw augers may be used to spread the asphalt transversely across the roadbed in front of a screed. A screed plate on the screed smooths and somewhat compacts the asphalt material and ideally leaves a roadbed of uniform depth and smoothness.

During paving operations, it can be helpful to understand the material density of the asphalt mat being created at various stages and times during the process. Current systems for measuring material density offer room for improvement in terms of efficiency and accuracy.

U.S. Pat. No. 10,227,738 describes a measurement system attached to a screed for measuring the thickness of the applied layer.

SUMMARY

In an example according to this disclosure, a paving machine can include a frame; a screed coupled to the frame; and a density sensor coupled to the paving machine and configured to measure a density of an asphalt mat as the screed passes over the asphalt mat.

In one example, a paving machine can include a frame; a screed coupled to the frame; and a density sensor coupled to the screed and configured to measure a density of an asphalt mat as the screed passes over the asphalt mat; and a controller coupled to the paving machine, wherein the density sensor is configured to send the measured density to the controller, and wherein the controller is configured to automatically make one or more adjustments to the paving machine operating parameters to achieve a desired asphalt mat density.

In one example, a method of controlling a density of an asphalt mat as the asphalt mat is being placed down can include positioning a density sensor on a screed of a paving machine; and using the measured density to make one or more adjustments to the paving machine operating parameters to achieve a desired asphalt mat density.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
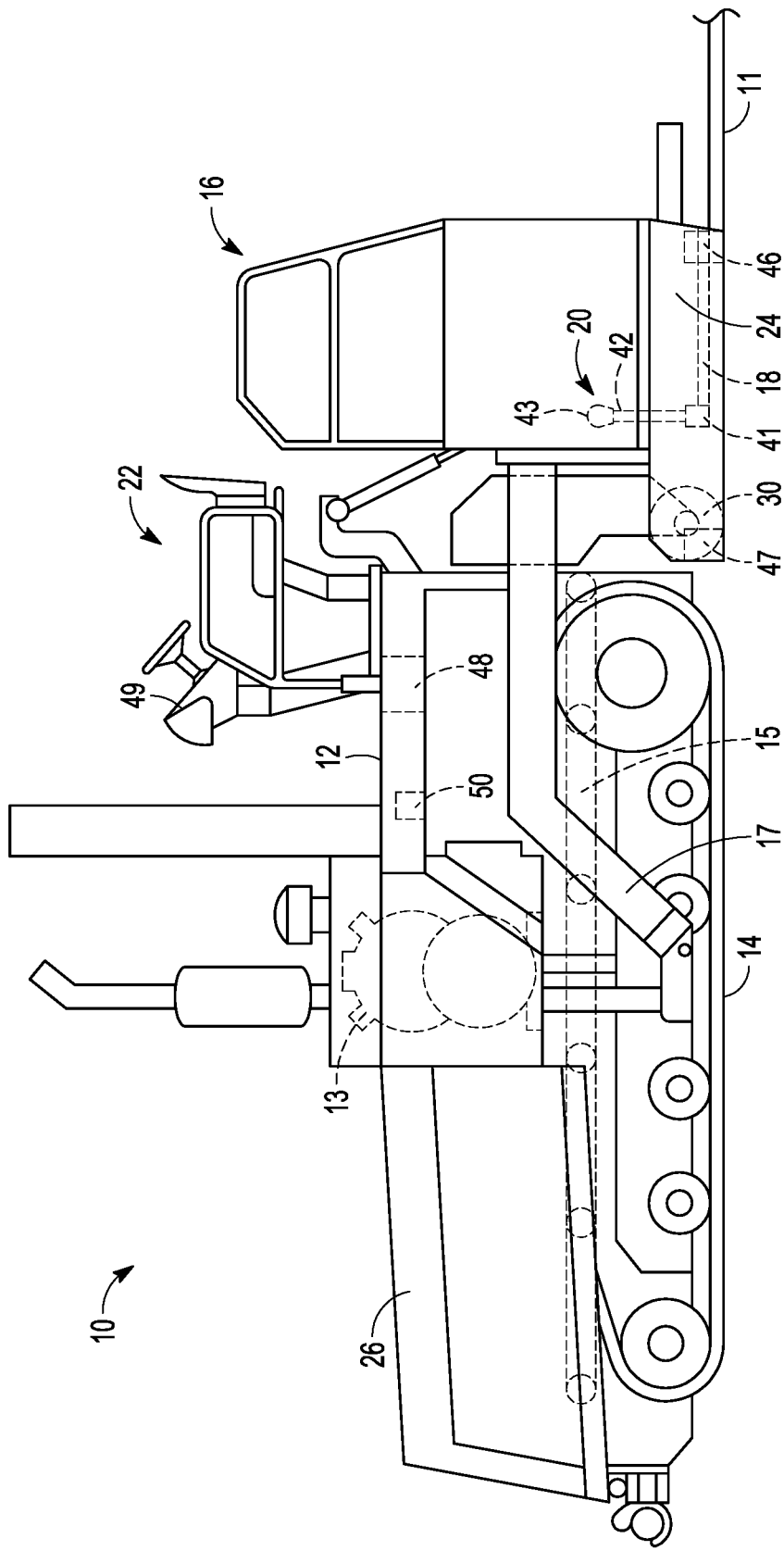
FIG. 1 shows a side view of a paving machine, in accordance with one embodiment.

FIG. 1 shows aside view of a paving machine 10 in accordance with one embodiment. The paving machine 10 generally includes a frame 12 with a set of ground-engaging elements 14 such as tracks or wheels coupled with the frame 12. The ground-engaging elements 14 may be driven by an engine 13 in a conventional manner. A screed 16 can be positioned at the rear end of the paving machine 10 to spread and compact paving material into an asphalt mat 11 having a desired thickness, size, uniformity, crown profile and cross slope. The paving machine 10 also includes an operator station 22 having a seat and a console, which includes various controls for directing operations of the paving machine 10 by inputting instructions at an input panel 49.

The paving machine 10 further includes a hopper 26 for storing a paving material, and a conveyor system including one or more conveyors 15 configured to move paving material from the hopper 26 to the screed 16 at the rear of the paving machine 10. One or more augers 30 are arranged near the forward end of the screed 16 to receive the paving material supplied by the conveyor 15 and spread the material evenly beneath the screed 16.

Reference to the "forward" end of the screed 16 means the end of screed 16 facing in the direction of travel of paving machine 10 as paving machine 10 is applying the paving material to a surface (to the left in FIG. 1). Similarly, reference to a "forward-facing" surface of a component of screed 16 means a surface facing in the direction of travel of paving machine 10 while paving machine 10 is applying paving material to a surface, while reference to an "aft-facing" surface of a component means a surface facing away from the direction of travel of paving machine 10 while paving machine 10 is applying paving material to a surface (to the right in FIG. 1).

The screed 16 can be pivotally coupled behind the paving machine 10 by a pair of tow arms 17 that extend between the frame 12 of the paving machine and the screed 16. The tow arms 17 can be pivotally connected to the frame 12 such that the relative position and orientation of the screed 16 relative to the screed frame and to the surface being paved may be adjusted by pivoting the tow arms 17, for example, in order to control the thickness of the paving material deposited by the paving machine 10.

The screed 16 can include a screed frame 24 with a screed plate 18 coupled to the screed frame 24. The screed plate 18 is configured to float on the paving material of the asphalt mat 11 laid upon a prepared paving bed and to "smooth" or level and compact the paving material on the base surface, such as for example a roadway or roadbed.

The screed 16 can include a tamper bar assembly 20 positioned forward of the screed plate 18 and extending transversely to the direction of travel of the paving machine 10. The tamper bar assembly 20 may include a tamper bar 41. Tamper bar assembly 20 can be coupled to the screed frame 24 of screed 16 and configured such that the tamper bar 41 is reciprocated in an upward and downward direction substantially perpendicular to the asphalt mat 11 and substantially perpendicular to the direction of travel of paving machine 10. For example, the tamper bar assembly 20 can include a connecting rod 42 configured to have a reciprocating up and down motion, where the connecting rod 42 can be coupled to an eccentric rotating shaft 43. Tamper bar 41 extends generally transverse to the paving direction over substantially the entire width of the screed plate 18. The tamper bar assembly 20 pre-compacts the paving material as the paving machine 10 moves forward and the screed 16 smooths the paving material to remove air pockets and other voids to create a flat, paved surface.

As noted above, during paving operations it can be helpful to understand the material density of the asphalt mat 11 being created at various stages and times during the process. Accordingly, the present system utilizes a density sensor 46 coupled to the paving machine 10. For example, the density sensor 46 can be coupled somewhere on the frame 12, the tow arms 17, or the screed 16. In this example, the density sensor 46 is coupled to the screed 16 and configured to measure a density of an asphalt mat 11 as the screed 16 passes over the asphalt mat 11. In one example, the density sensor 46 can include ground penetrating radar to measure density. Other examples of a density sensor can include a nuclear density gauge, a non-nuclear density gauge, or other asphalt density meters or sensors. Here, the density sensor 46 is coupled to a rear of the screed 16 to measure the asphalt mat density. In other examples, more than one density sensor 46 can be located at various positions on the screed to measure the asphalt mat density.

In one example, the density sensor 46 can be configured to send the measured density of the asphalt mat 11 to an operator of the paving machine 10 such that the operator can make one or more adjustments at the input panel 49 to paving machine 10 operating parameters to achieve a desired asphalt mat density.

For example, such adjustments can include an adjustment of the screed down-pressure, or the operator can make an adjustment to the speed of the paving machine 10, or the tamper rate of the tamper bar 41 can be adjusted, or the speed or height of the auger 30 can be adjusted.

The density measurement detected by the density sensor 46 can also indicate additional asphalt mat 11 quality characteristics such as segregation of the material. Segregation would be evident with bands of larger aggregate at the surface and can also be corrected with changes to paving machine configuration and performance. For example, the larger rocks would be accompanied with air gaps which would show up in a density analysis. Thus, there may be too much aggregate material in one area of the mat. This can be caused by the auger 30 not evenly spreading the asphalt material uniformly. In such a situation the operator can adjust the speed or height of the auger 30 to improve the quality of the asphalt mat 11.

In one example, a second density sensor 47 can be located near the front of the screed 16 or on the frame 12 of the paving machine 10. The second density sensor 47 can be utilized to measure the density of the base material before the asphalt mat 11 is laid down. This information may further inform the operator about proper machine settings to achieve a desired density of the asphalt mat 11. Having the ability to know the density of the base material prior to paving could inform operators of inconsistent or inadequate density, which can lead to premature failure of the paved surfaces.

In one example, the density data provided by density sensor 46 can be used in an automatic control of the paving machine 10 in a manner similar to the above described, but without operator intervention.

Figure 2:
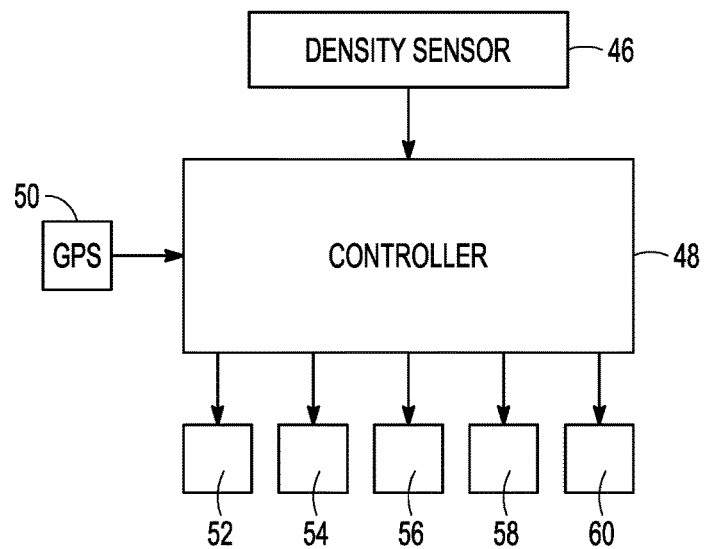
FIG. 2 shows a schematic view of a density control system, in accordance with one embodiment.

For example, now referring also to FIG. 2, which shows a density control system, the density sensor 46 can be configured to send the measured density of the asphalt mat 11 to a controller 48 associated with the paving machine 10. The controller 48 can be configured to automatically make one or more adjustments to the paving machine 10 operating parameters to achieve a desired asphalt mat density.

For example, the controller 48 can send instructions to the paving machine 10 to adjust the screed down pressure 52, or the speed of the paving machine can be adjusted 54, or the tamper rate 56 of the tamper bar 41 can be adjusted, or the speed or the height of the auger 30 can be adjusted 58.

In one example, the paving machine 10 further includes a location sensor 50 located on the paving machine 10 and coupled to the controller 48. Moreover, any collected density or location information can be time-stamped so that the density and location at any given time is known throughout the process. In use with the density sensor 46, the controller 48 can store the measured density at the screed 16 along with location information of the measured density for later analysis. The density information and the location information can be analyzed by the controller 48 to allow for a fully autonomous paving machine. In an example, the controller 48 can use the density and the location to compare with location maps or other real time data to continually adjust the machine settings, such as the machine speed, tamping rate, etc. without user intervention.

Moreover, in one embodiment, the controller 48 can be configured to send the measured density of the asphalt mat 11 to other paving equipment 60 at a same work site as the paving machine 10. This information can be used by a roller operator, for example, to adjust the performance of the roller. For example, the controller 48 can send the density and location information to a controller on the roller and the roller controller can automatedly adjust certain roller parameters depending on the location of the roller and the known density of the asphalt mat at that location so that the proper vibration or roller speed is being used for optimal asphalt density. Moreover, the number of roller passes can be adjusted for more efficiency. If the density of the asphalt mat is known in real time, fewer passes may be needed, for example. Accordingly, the present system can allow for the entire paving operation to be automatically controlled so as to have improved efficiency.

Figure 3:
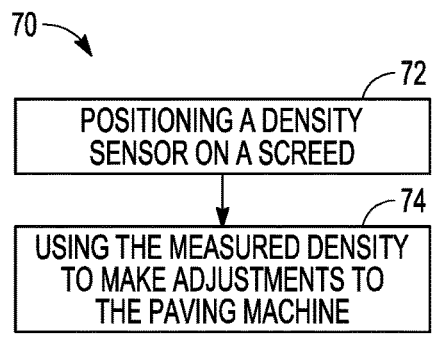
FIG. 3 shows a method of controlling a density of an asphalt mat, in accordance with one embodiment.

FIG. 3 shows a method 70 of controlling density of an asphalt mat as the asphalt mat 11 is being placed down, in accordance with one embodiment.

Here, the method can include positioning (72) the density sensor 46 on the screed 16 of the paving machine 10; and using (74) the measured density to make one or more adjustments to the paving machine 10 operating parameters to achieve a desired asphalt mat density.

For example, as discussed above, the density sensor 46 can be configured to send the measured density to the operator of the paving machine 10 such that the operator can make one or more adjustments to the paving machine 10 operating parameters to achieve the desired asphalt mat density.

In another option, the density sensor 46 can be configured to send the measured density to the controller 48 associated with the paving machine 10, and wherein the controller 48 can be configured to automatically make one or more adjustments to the paving machine 10 operating parameters to achieve the desired asphalt mat density.

As discussed above, the one or more adjustments can include a screed down-pressure adjustment, a paving machine speed adjustment, a tamper rate adjustment of a tamper bar 41, or an auger speed and height control. Further, the density information can be sent to other machines in the paving train or saved for later analysis along with location information, for example.

INDUSTRIAL APPLICABILITY

The present system is applicable to paving systems. The density of the asphalt mat 11 at various stages and times during the process is a useful measurement to gauge quality of a paving process. Current systems for measuring material density offer room for improvement in terms of efficiency and accuracy. For example, while methods exist to measure this density, they are typically stand-alone systems and are not integrated into the paving process itself in real time.

In contrast, the present system place the density sensor 46 (e.g. ground penetrating radar) on the screed 16 of the asphalt paving machine 10. The density reading can then be either provided to the operator to allow machine operating parameter adjustments to achieve a set specification or may be fed directly to the controller 48 for automated adjustment of machine parameters (e.g. tamper rate, down pressure, paving machine speed, or other adjustable parameters).

Figure 4:
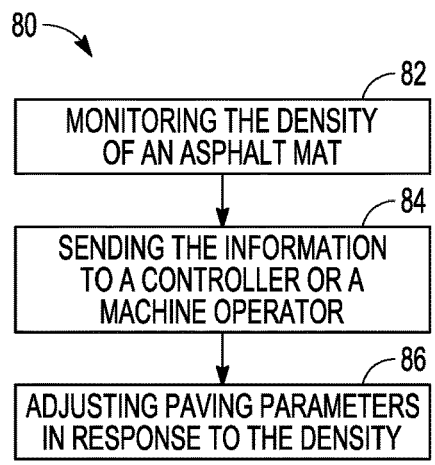
FIG. 4 shows a method of controlling a density of an asphalt mat, in accordance with one embodiment.

FIG. 4 shows a method for controlling a density of an asphalt mat in real time as the asphalt mat is being laid. Here, the method 80 includes monitoring (82) the density of the asphalt mat 11 as the asphalt mat is being laid down. As, noted this is accomplished by positioning the density sensor 46 on the paving machine 10. For example, the density sensor 46 can be mounted directly on the screed 16, for example near the rear of the screed 16. The method further includes sending (84) the density information to either the operator of the machine or the controller 48. The method further includes adjusting (86) one or more paving parameters associated with the machine in response to the density information to achieve a desired asphalt mat density. In various embodiments, these parameters can include one or more of tamper rate, down pressure, paving machine speed, and auger speed or height. Moreover, the density information can be sent to other paving equipment in the paving train, such as rollers.

Also, in combination with a location sensor, the controller 48 can store the measured density at the screed 16 along with location information of the measured density for later analysis. Moreover, this asphalt mat density information can be collected and analyzed in conjunction with density data captured after paving rollers have been also operated to improve performance of the entire paving train.

Overall, the present system allows the density information and the location information to be analyzed by the controller 48 to allow for a fully autonomous paving machine. Moreover, the system provides that the controller 48 can send the density and location information to a controller on a roller working at the paving location, and the roller controller can automatedly adjust certain roller parameters depending on the location of the roller so that the proper vibration or roller speed is being used for optimal asphalt density. For example, the number of roller passes can be adjusted for more efficiency. Accordingly, the present system can allow for the entire paving operation to be automatically controlled so as to have improved efficiency.

The above detailed description is intended to be illustrative, and not restrictive. The scope of the disclosure should, therefore, be determined with references to the appended claims, along with the full scope of equivalents to which such claims are entitled.

What is claimed is:

1. A paving machine comprising:
   a frame;
   a screed coupled to the frame;
   a first density sensor coupled to the paving machine and configured to measure a density of an asphalt mat as the screed passes over the asphalt mat, and a second density sensor on the machine to measure the density of an existing base material before the asphalt mat is laid down; and
   a controller, wherein the density sensors are configured to send the measured densities to the controller, and wherein the controller is configured to send the measured densities from the first density sensor and the second density sensor to other paving equipment at a same work site as the paving machine, and wherein the other paving equipment is configured to have one or more operating parameters adjusted based on the measured densities.

2. The paving machine of claim 1, wherein the first measured density provides information regarding segregation of material in the asphalt mat, and one or more adjustments to the paving machine operating parameters can be made to achieve a desired asphalt mat segregation.

3. The paving machine of claim 1, wherein the density sensors are configured to send the measured densities to an operator of the paving machine such that the operator can make one or more adjustments to the paving machine operating parameters to achieve a desired asphalt mat density.

4. The paving machine of claim 3, wherein the one or more adjustments can include a screed down-pressure adjustment.

5. The paving machine of claim 3, wherein the one or more adjustments can include a paving machine speed adjustment.

6. The paving machine of claim 3, wherein the paving machine further includes a tamper bar, and the one or more adjustments can include a tamper rate adjustment of the tamper bar.

7. The paving machine of claim 3, wherein the paving machine includes an auger located in front of the screed, and the one or more adjustments can include an auger speed adjustment or an auger height adjustment.

8. The paving machine of claim 1, wherein the density sensors are configured to send the measured densities to the controller, and wherein the controller is configured to automatically make one or more adjustments to the paving machine operating parameters to achieve a desired asphalt mat density.

9. The paving machine of claim 8, wherein the paving machine further includes a location sensor coupled to the controller, and wherein the first measured density at the screed can be stored along with location information for later analysis.

10. A paving machine comprising:
    a frame;
    a screed coupled to the frame; and
    a first density sensor coupled to the screed and configured to measure a density of an asphalt mat as the screed passes over the asphalt mat, a second density sensor on the machine to measure the density of an existing base material before the asphalt mat is laid down; and a controller coupled to the paving machine, wherein the first density sensor and the second density sensor are configured to send the measured densities to the controller, and wherein the controller is configured to automatically make one or more adjustments to the paving machine operating parameters to achieve a desired asphalt mat density based on the measured densities.

11. The paving machine of claim 10, wherein the one or more adjustments can include a screed down-pressure adjustment.

12. The paving machine of claim 10, wherein the one or more adjustments can include a paving machine speed adjustment.

13. The paving machine of claim 10, wherein the paving machine further includes a tamper bar, and the one or more adjustments can include a tamper rate adjustment of the tamper bar.

14. The paving machine of claim 10, wherein the paving machine includes an auger located in front of the screed, and the one or more adjustments can include an auger speed or height adjustment.

15. The paving machine of claim 10, wherein the paving machine further includes a location sensor coupled to the controller, and wherein the measured density at the screed can be stored along with location information for later analysis.

16. The paving machine of claim 10, wherein the controller is configured to send the measured density of the asphalt mat to other paving equipment at a same work site as the paving machine.

17. A method of controlling a density of an asphalt mat as the asphalt mat is being placed down, comprising:

positioning a first density sensor on a screed of a paving machine and a second density sensor on the paving machine prior to the screed;

measuring the density of an existing base material before the asphalt mat is laid down measuring the density of an asphalt mat, wherein the measured density provides information regarding segregation of material in the asphalt mat; and using the measured density of the base material and of the asphalt mat to make one or more adjustments to the paving machine operating parameters to achieve a desired asphalt mat density and a desired asphalt mat segregation, wherein the paving machine includes an auger located in front of the screed, and the one or more adjustments can include an auger speed adjustment and an auger height adjustment to achieve the desired asphalt mat segregation.

18. The method of claim 17, wherein the first and second density sensors are configured to send the measured densities to an operator of the paving machine such that the operator can make one or more adjustments to the paving machine operating parameters to achieve a desired asphalt mat density.

19. The method of claim 17, wherein the first and second density sensors are configured to send the measured densities to a controller associated with the paving machine, and wherein the controller is configured to automatically make one or more adjustments to the paving machine operating parameters to achieve a desired asphalt mat density.

20. The method of claim 17, wherein the one or more adjustments can include a screed down-pressure adjustment, a paving machine speed adjustment, and a tamper rate adjustment of a tamper bar.

* * * * *